April 23, 1929. G. D. DODD 1,710,474
WEIR METER
Filed April 11, 1922 2 Sheets-Sheet 1

INVENTOR
Gerald D Dodd
BY John E. Hubbell
his ATTORNEY

INVENTOR
Gerald D. Dodd
BY John E. Hubbell
his ATTORNEY

Patented Apr. 23, 1929.

1,710,474

UNITED STATES PATENT OFFICE.

GERALD D. DODD, OF OAKLYN, NEW JERSEY, ASSIGNOR TO H. S. B. W. COCHRANE CORPORATION, OF PHILADELPHIA, PENNSYLVANIA, A CORPORATION OF PENNSYLVANIA.

WEIR METER.

Application filed April 11, 1922. Serial No. 551,647.

My present invention relates to weir meters and particularly to weir meters such as the so-called metering heaters in which the water or other liquid flowing over the meter weir is hot, and the general object of my invention is to provide improved means for measuring the height of liquid level in the still water chamber or body of liquid on the supply side of the weir. My invention is particularly concerned with the connection of the float chamber to the still water chamber in meters in which the float for operating the flow indicating device is located in a float chamber separate from the still water chamber. My invention is also concerned with the connection between the still water chamber and the external zero level chamber commonly provided with a weir meter to facilitate the calibration of the flow indicating provisions. The general purpose of the improved connections between the float and zero chambers and the still water chamber is to insure the same liquid level in these chambers as in the still water chamber under the varying conditions of operation in which changes in level in the still water chamber, and variations in liquid temperature tend to create variations between the height of liquid level in the still chamber and in the float and zero level chambers.

The various features of novelty which characterize my invention are pointed out with particularity in the claims annexed to and forming a part of this specification. For a better understanding of the invention, however, and its advantages reference should be had to the accompanying drawings and descriptive matter in which I have illustrated and described preferred embodiments of my invention.

Figure 1:
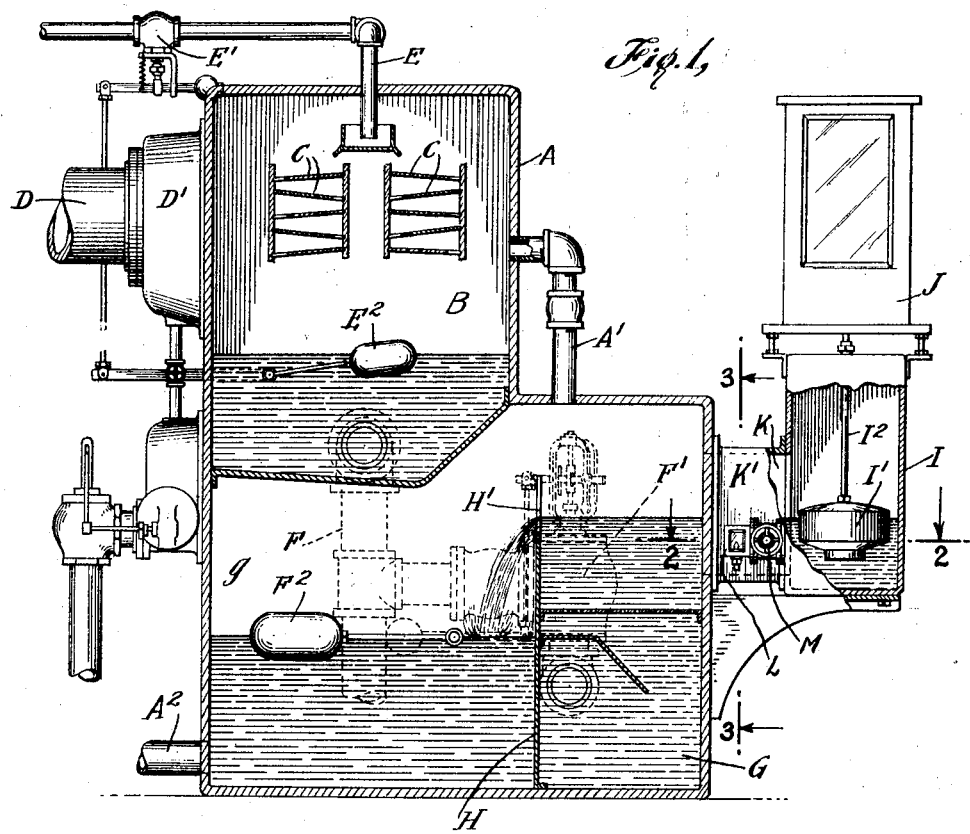
Fig. 1 is an elevation with parts broken away and in section of a metering heater provided with external float and zero level chambers.
Figures 2, 3:
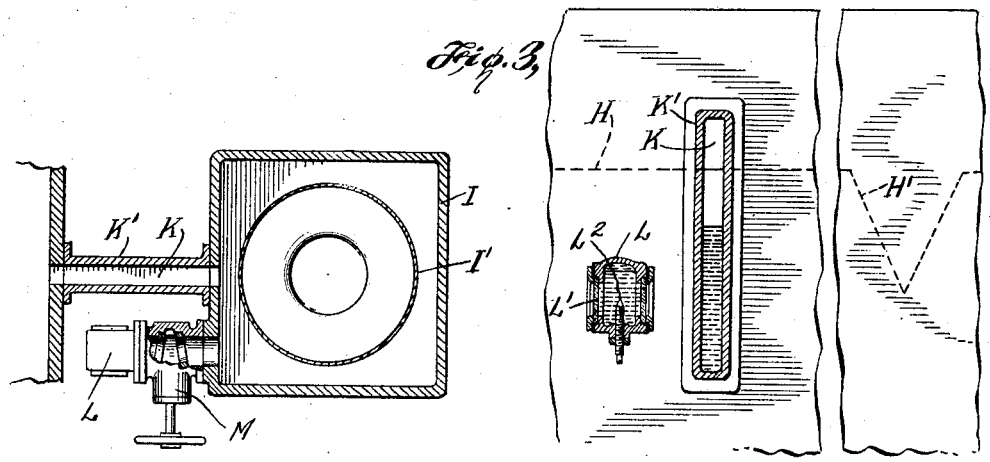
Fig. 2 is a sectional plan of a portion of the apparatus shown in Fig. 1, the section being taken on the line 2—2 of Fig. 1.
Fig. 3 is a sectional elevation of a portion of the apparatus shown in Fig. 1, the section being taken on the line 3—3 of Fig. 1.

In Figs. 1, 2, and 3 of the drawings I have illustrated the use of my invention in connection with a so-called metering heater A of known type comprising a water heating chamber B provided with water spreading trays C, and having a steam inlet D through the usual oil and water separator D', and a cold water inlet pipe E. The flow of water through the pipe E is controlled by a valve E' automatically adjusted by a float $E^2$ which is responsive to the height of water level in the chamber B and tends to maintain this water level approximately constant. From the heating chamber B, the heated water passes through piping F into the still water chamber G of the weir meter. The still water chamber G is separated from the outlet chamber $g$ of the meter by a partition H rising from the bottom wall of the weir chamber and provided at its upper end with one or more weir notches H'. The flow of water through the piping F into the still water chamber G is controlled by a valve F' and actuating float $F^2$ therefor, the latter being responsive to the height of water level in the chamber $g$. The heated and measured water passes out of the chamber $g$ through the service pipe line $A^2$. The weir chambers G and $g$ are in free communication above the partition H, and a pipe A' is provided to equalize the vapor pressure in the chambers G and $g$ with the vapor pressure in the heating chamber B. In so far as above described the metering heater shown in Figs. 1, 2, and 3, embodies nothing novel with me, but on the contrary is of a well known type in common use.

Associated with the still water chamber, is a closed float chamber I in which the same water level is maintained as in the still water chamber. The float chamber contains a float I', the stem $I^2$ of which passes through the stuffing box provided for the purpose in the top of the float chamber, and actuates a suitable indicating apparatus located in the instrument case J which is mounted above the float chamber I. It will be understood that by the term "indicating apparatus" I mean to include any usual or suitable apparatus for recording and registering, as well as for giving a simple indication of the flow over the weir.

The float chamber I, float I', instrument case J and apparatus contained therein may be of standard construction, my present invention being concerned merely with the connection between the still water chamber and the float chamber. The novel characteristic of this connection is that it provides a channel or port K connecting the still water chamber to the float chamber which is vertically elongated to extend from an upper level above the maximum height of liquid level in the still water chamber to a lower level at least as low as the bottom of the weir notch, and is of restricted width in a horizontal direction transverse to its length so that in cross section, as seen in Fig. 3, the channel or port K is in the form of a narrow vertical slot. Advantageously, for mechanical and other reasons, it is ordinarily desirable to make this slot of a horizontal length which is several times its width. In the preferred construction shown in Figs. 1, 2 and 3, the body portion of the port K is formed by a passage in a casting K' which has flanged ends secured against pad or shoulder portions formed on the outer wall of the still water chamber and float chamber at the margin of slots formed in the wall and float chamber, respectively, and constituting the end portions of the port K.

L represents the so-called zero level chamber, which, in the construction shown, is mechanically connected to, and supported by the float chamber I through the casing of a valve M which when open places the interior of the zero level chamber in communication with the interior of the float chamber. The zero level chamber as shown has opposite vertical walls provided with glass windows L', and is provided with a level measuring screw threaded through its bottom wall and having a conical upper end terminating in a point $L^2$. The valve M is a gate valve of such character that when in its open position the zero level chamber is connected to the float chamber and thereby to the still water chamber by a thoroughfare of very considerable vertical depth and appreciable width.

While the invention is obviously not restricted to precise dimensions it may be noted that in an ordinary metering heater of the character shown in which the effective vertical depth of the V-weir notch is 8 inches say, the port K may extend vertically from a level 10 inches or so above the bottom of the weir notch to a level a few inches below the bottom of the weir notch, and the thoroughfare through the valve L when open may well be 3 or 4 inches in diameter.

In the described construction, the connection K' forms a simple, rigid and effective mechanical connection between the body of the metering heater and the float chamber for supporting the latter. The character of the communicating channel or port K, between the still water chamber and the float chamber insures the maintenance, with desirable exactness, of the same level in the float chamber as in the still water chamber, notwithstanding conditions of operation which have heretofore made it practically impossible to maintain the desired identity in water level in the still water chamber and a separate float chamber. With the present construction, the communicating port is of sufficient cross sectional area to permit a flow back and forth through it rapid enough to effect practically instantaneous equalization of the levels in the two chambers when the level in the still water chamber rises and falls, while at the same time, the general shape of the port tends to restrict and prevent flow pulsations or surges of flow through it, tending to momentarily disturb the equality of level, on a rapid change in level in the still water chamber. The port K provides a free path for liquid flow between the still water chamber and the float chamber at the liquid level wherever that may be, and thus tends to maintain at all times an exact equality of height in water level in the still water chamber and float chamber notwithstanding differences in liquid density in the two chambers resulting from differences in temperature. This is of especial importance where the float chamber is external of the meter and heater as in Figs. 1, 2, and 3, and in consequence of radiation losses the temperature of the liquid in the float chamber is normally below the temperature of the liquid in the still water chamber.

The size, shape and disposition of the port K tend also to minimize the disturbance of liquid level in the float chamber resulting from a rapid reduction of vapor pressure in the system and the consequent ebullition of the liquid in the system which may occur at times, although the location of the float chamber outside of the meter and heater, and the consequent fact that the temperature in the float chamber is normally below that of the still water chamber tends to minimize ebullition in the float chamber.

The zero level chamber is ordinarily used only at infrequent intervals when it becomes necessary to calibrate the indicating apparatus. For this purpose the point $L^2$ is adjusted so that it is at exactly the same level as the bottom of the weir notch or notches H. Then, when the liquid level in the chamber L is that of the pointed screw end L², the indicating apparatus may be adjusted to give zero flow indication. The effectiveness of the zero level chamber device obviously depends upon whether or not the level therein is exactly the same as it is in the float chamber. The chambers L and I are both level measuring chambers, and in a general way the same conditions tending to produce variations in liquid level in the chambers G and I tend to produce variation in liquid level in the chambers G and L, and these conditions are taken care of with the described construction, in the case of the zero level chamber L, as in that of the float chamber I. The valved connection M illustrated in Figs. 1, 2, and 3, provides a simple and effective means for mechanically supporting the zero level chamber L and for permitting the latter to be closed off from the float chamber and still water chamber when not in use, as is generally desirable.

Figure 4:
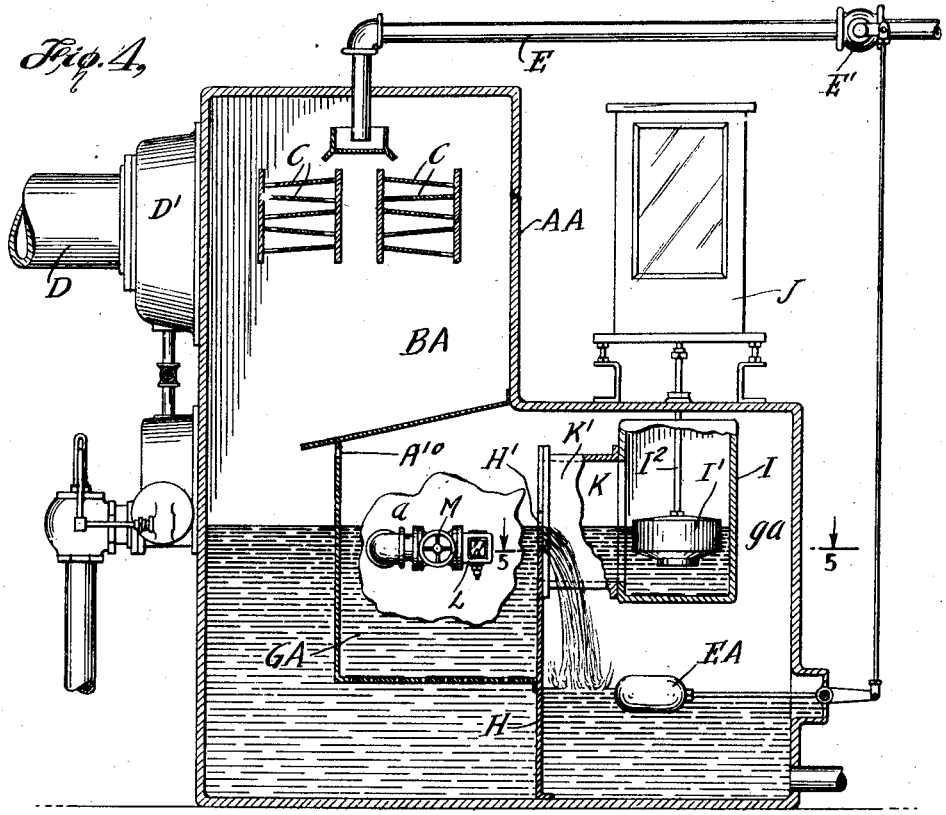
Fig. 4 is a view taken similarly to Fig. 1 illustrating a modification in which the float chamber is located within the weir meter housing.
Figure 5:
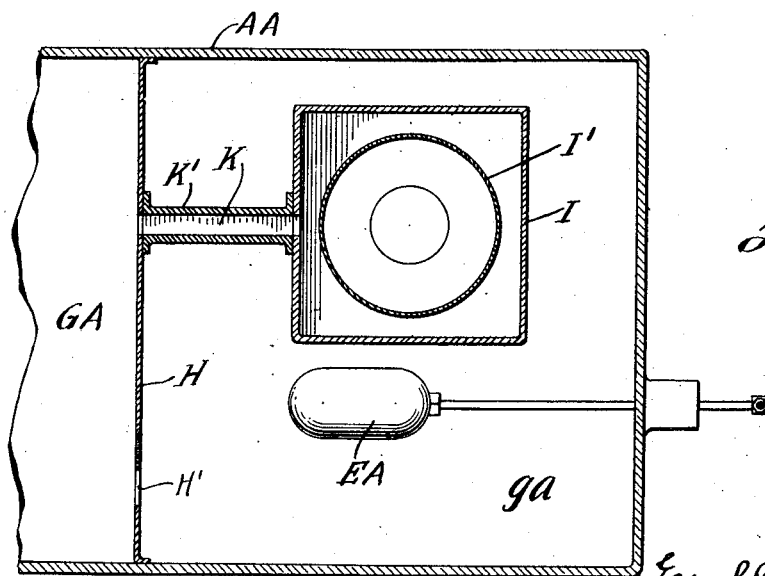
Fig. 5 is a sectional plan of a portion of the apparatus shown in Fig. 4, the section being taken on the line 5—5 of Fig. 4.

In the modified form of my invention shown in Figs. 4 and 5 the metering heater AA shown, is of a known type in which the passages through which the heated water passes from the heating chamber BA into the still water chamber GA of the weir meter are located within the common housing for the heater and weir meter. A port A¹⁰ serves to equalize the vapor pressure in the still water and outlet chambers GA and *ga*, respectively, with that in the heating chamber. The valve E′ regulating the flow of water to the heater through the pipe E is controlled in Figs. 4 and 5, by a float EA located in, and responsive to the water level in the weir outlet chamber *ga*. In this form of my invention the float chamber I is located in the outlet chamber *ga*, and is connected to the still water chamber by a connection part K′ which may be exactly like the connection part K′ shown in Figs. 1 to 3, and is similarly connected at one end to the float chamber I. At its opposite end the connection part K′ is secured to the weir carrying partition H, the latter being formed with a port registering with the passage K in the connection part K′. In the construction shown in Figs. 4 and 5, the zero level chamber L is connected to the outer wall *a*, of the still water chamber GA, which is formed with a port registering with the thoroughfare through the valve M.

The location of the float chamber within the meter casing as shown in Figs. 4 and 5 tends to the maintenance of temperature equality in the liquid and float chambers, but except for this, my improved float chamber and still water connection gives the same advantageous results in the arrangement of Figs. 4 and 5 as are obtained in the arrangement shown in Figs. 1, 2, and 3.

While in accordance with the provisions of the statutes I have illustrated and described the best forms of my invention now known to me, it will be apparent to those skilled in the art that changes may be made in the form of the apparatus disclosed without departing from the spirit of my invention as set forth in the appended claims.

Having now described my invention, what I claim as new and desire to secure by Letters Patent, is:

1. In a weir meter comprising a still water chamber and a weir over which liquid flows out of said chamber, the combination of a separate level measuring chamber spaced away from the still water chamber, and means for maintaining the same liquid levels in said chambers, comprising a passageway which connects the interiors of the two chambers, and extends between levels as high and as low, respectively, as the maximum and minimum liquid levels normally prevailing in the still water chamber.

2. In a weir meter comprising a still water chamber and a weir over which liquid flows out of said chamber, the combination of a separate level measuring chamber spaced away from the still water chamber, and means for maintaining the same liquid levels in said chambers, comprising a deep narrow passageway which connects the interiors of the two chambers and extends between levels as high and as low, respectively, as the maximum and minimum liquid levels normally prevailing in the still water chamber.

3. In a weir meter comprising a still water chamber and a weir over which liquid overflows from said chamber, the combination with a wall of said chamber, of a separate level measuring chamber spaced away from the still water chamber, and a connecting part through which said level measuring chamber is mechanically connected to and supported by said wall, said connecting part being formed with a passage extending between levels as high and as low, respectively, as the maximum and minimum liquid levels normally prevailing in the still water chamber, and said wall and chamber being formed with openings registering with said passage.

4. In a weir meter comprising a still water chamber and a weir over which liquid flows out of said chamber, the combination with a wall of said chamber, of a float chamber spaced away from said still water chamber and means providing a passageway which connects the interiors of the still water and float chambers and is of narrow width but is vertically elongated from a level above the maximum normal height of liquid level in the still water chamber to a level below the lowermost level of flow over the weir.

5. In a weir meter comprising a still water chamber and a weir over which liquid flows out of said chamber, the improvement comprising a zero level chamber external to the still water chamber, and means connecting said chambers providing a thoroughfare between the chambers of substantial vertical depth and width and projecting above and below the lowermost level of the flow over the weir.

6. In a weir meter comprising a still water chamber and a weir over which liquid flows out of said chamber, the improvement comprising a zero level chamber external to the still water chamber, means connecting said chambers providing a thoroughfare between the chambers of substantial vertical depth and width and projecting above and below the lowermost level of the flow over the weir, and a valve for closing said thoroughfare and formed with a passage which when the valve is open forms a section of said thoroughfare of substantially the same depth and height as the rest of the thoroughfare.

7. In a hot water weir meter comprising a still water chamber and a weir over which the water flows out of said chamber the combination of a separate level measuring chamber external to and normally at a lower temperature than the weir chamber and means mechanically connecting the walls of said chambers and formed with a deep narrow passageway connecting the interiors of the two chambers and extending between levels as high and as low, respectively, as the maximum and minimum water levels prevailing in the still water chamber.

Signed at Philadelphia in the county of Philadelphia and State of Penna., this 4th day of April A. D. 1922.

GERALD D. DODD.